US009154462B2

(12) United States Patent
Grimes et al.

(10) Patent No.: US 9,154,462 B2
(45) Date of Patent: Oct. 6, 2015

(54) METHODS, SYSTEMS, AND COMPUTER PROGRAM PRODUCTS FOR MANAGING FIREWALL CHANGE REQUESTS IN A COMMUNICATION NETWORK

(75) Inventors: Robert Preston Grimes, Roswell, GA (US); Kevin W. Luther, Roswell, GA (US); Shawn M. Hiemstra, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 634 days.

(21) Appl. No.: 12/644,326

(22) Filed: Dec. 22, 2009

(65) Prior Publication Data

US 2011/0154470 A1 Jun. 23, 2011

(51) Int. Cl.
*G06F 15/177* (2006.01)
*H04L 29/06* (2006.01)

(52) U.S. Cl.
CPC .................................. *H04L 63/0263* (2013.01)

(58) Field of Classification Search
CPC .................................................... H04L 63/0263
USPC ..................................... 709/213, 221; 726/11
See application file for complete search history.

(56) References Cited

U.S. PATENT DOCUMENTS

| 6,801,949 | B1* | 10/2004 | Bruck et al. | 709/232 |
|---|---|---|---|---|
| 2002/0059432 | A1* | 5/2002 | Masuda et al. | 709/227 |
| 2002/0059517 | A1* | 5/2002 | Haviv et al. | 713/154 |
| 2002/0064149 | A1* | 5/2002 | Elliott et al. | 370/352 |
| 2002/0156904 | A1* | 10/2002 | Gullotta et al. | 709/229 |
| 2002/0169876 | A1* | 11/2002 | Curie et al. | 709/226 |
| 2003/0120955 | A1* | 6/2003 | Bartal et al. | 713/201 |
| 2005/0102364 | A1* | 5/2005 | Ozzie et al. | 709/207 |
| 2005/0120247 | A1* | 6/2005 | Barrett | 713/201 |
| 2007/0234413 | A1* | 10/2007 | Borchers et al. | 726/11 |
| 2008/0281833 | A1* | 11/2008 | Cain et al. | 707/100 |
| 2008/0289026 | A1* | 11/2008 | Abzarian et al. | 726/11 |
| 2009/0044003 | A1* | 2/2009 | Berthiaume et al. | 713/100 |
| 2009/0245236 | A1* | 10/2009 | Scott et al. | 370/352 |

OTHER PUBLICATIONS

"WSU—Firewall change request Form", Dated Sep. 2008.*
"Firewall change request form", Dated May 2009.*

* cited by examiner

*Primary Examiner* — Vivek Srivastava
*Assistant Examiner* — Hermon Asres
(74) *Attorney, Agent, or Firm* — Myers Bigel Sibley & Sajovec, PA

(57) ABSTRACT

A method of managing firewall change requests for a communication network includes providing a change request interface comprising a plurality of change request form types, each request form including an interface for entering requestor identification information, Internet Protocol (IP) address information, change implementation schedule information, and submission information specifying any requestor instructions for implementing the change, receiving completed change request forms from at least one requestor, arranging the completed change request forms in a request queue, and presenting the request queue to at least one administrator responsible for implementing firewall changes in the communication network.

9 Claims, 5 Drawing Sheets

METHODS, SYSTEMS, AND COMPUTER PROGRAM PRODUCTS FOR MANAGING FIREWALL CHANGE REQUESTS IN A COMMUNICATION NETWORK

BACKGROUND

The present disclosure relates generally to communication networks, and, more particularly, to methods, systems, and computer program products for managing firewalls that control access to communication networks.

Communications networks are widely used for nationwide and worldwide communication of voice, multimedia and/or data. As used herein, communications networks include private networks, public communications networks, such as the Public Switched Telephone Network (PSTN), terrestrial and/or satellite cellular networks and/or the Internet.

Private networks, such as networks used by businesses and other entities, are typically connected to public networks, such as the Internet, as such private networks may include servers that provide various retail or other e-commerce services to Internet users. Such internet-connected networks are often subject to attack from unauthorized users. Such attacks may compromise confidential information or consume server resources.

A variety of techniques have been devised for protecting such devices. For example, a device protecting a network may maintain a "whitelist" of internet addresses that are allowed to access the server. However, such whitelists may need to be updated (often manually) as users move from one location to another. Other techniques for protection include "port knocking," in which a coded sequence of TCP (transmission control protocol) SYN (synchronize) requests to specific ports to authenticate a user, and "single packet authorization" (SPA), in which a specially coded packet authenticates a user and data.

Some access control techniques involve the use of firewalls. Typical firewall devices inspect and filter traffic before making a decision on what to do with a packet. They commonly have two interfaces, an internal interface and an external interface. The external interface may communicate with a router connected to the Internet, while the internal interface may communicate with a local router or private network. Packets received at the external interface are generally passed or rejected according to criteria associated with the firewall. For authorized packets, the firewall typically performs network address translation (NAT) and routes the modified authorized packets towards their destinations. A "transparent" firewall foregoes such routing operations by filtering at the data link layer instead of the network layer, acting like a network bridge rather than a router. Transparent firewalls are also referred to as in-line, shadow, stealth or bridging firewalls. Firewalls are generally managed by a security administrator using various tools to process change requests to the configurations of the firewalls.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of managing firewall change requests for a communication network, comprising providing a change request interface comprising a plurality of change request form types, each request form comprising an interface for entering requestor identification information, Internet Protocol (IP) address information, change implementation schedule information, and submission information specifying any requestor instructions for implementing the change, receiving completed change request forms from at least one requestor, arranging the completed change request forms in a request queue, and presenting the request queue to at least one administrator responsible for implementing firewall changes in the communication network.

In other embodiments, the method further comprises authenticating the at least one requestor using single sign on authentication.

In still other embodiments, the request queue comprises at least one of the following types of information for each of the completed change request forms: date information, time information, the requestor identification information, tester information, affected firewall information, and change request status information.

In still other embodiments, the plurality of change request form types comprises at least one of the following request types: a standard source to destination request, an IP address modification to existing firewall rules request, a File Transfer Protocol (FTP) account request, a custom request, a Network Address Translation (NAT) modification request, a modification associated with a group of associated IP addresses.

In still other embodiments, the method further comprises receiving approval of at least one completed change request form by a security administrator responsible for authorizing firewall change requests.

In still other embodiments, the method further comprises sending notifications to the at least one requestor associated with each of the completed change request forms, respectively, wherein each notification comprises status information associated with the change request.

In still other embodiments, the method further comprises communicating with at least one firewall in the communication network regarding at least one of IP address information, policy information, and rule information.

In still other embodiments, the method further comprises maintaining a topology of the communication network and locations of firewalls therein and identifying, for each of the completed change request forms, firewalls affected by the change request based on the topology of the communication network.

In still other embodiments, the method further comprises defining a firewall in the topology of the communication of the communication network, defining at least one segment in the topology of the communication network that the defined firewall protects, and defining, for each of the at least one segment, a protection purpose.

In still other embodiments, the method further comprises receiving a request from the at least one requestor to unblock access to a Website responsive to the at least one requestor having been blocked from accessing the Website and presenting the unblock request to at least one administrator responsible for granting access to the Website.

In still other embodiments, the method further comprises defining a group of associated IP addresses, wherein at least one of the complete change request form comprises the defined group of associated IP addresses.

In still other embodiments, the defined group is defined by one of the at least one requestor for use in the one of the at least one requestor's change request form.

In still other embodiments, the defined group is defined by the at least one administrator for use by any of the at least one requestor in the at least one requestors' change forms.

In still other embodiments, the method further comprises generating at least one report based on the completed change request forms.

In still other embodiments, the method further comprises identifying at least one firewall protection zone in the communication network associated with the IP address information.

In still other embodiments, the method further comprises identifying at least one firewall rule associated with the received IP address information.

In still other embodiments, the method further comprises examining rules associated with at least one firewall in the communication network and determining whether the examined rules can be consolidated to reduce a number of the rules.

In further embodiments, a system for managing firewall change requests in a communication network comprises a data processing system that is configured to provide a change request interface comprising a plurality of change request form types, each request form comprising an interface for entering requestor identification information, Internet Protocol (IP) address information, change implementation schedule information, and submission information specifying any requestor instructions for implementing the change, to receive completed change request forms from at least one requestor, to arrange the completed change request forms in a request queue, and to present the request queue to at least one administrator responsible for implementing firewall changes in the communication network.

In still further embodiments, the plurality of change request form types comprises at least one of the following request types: a standard source to destination request, an IP address modification to existing firewall rules request, a File Transfer Protocol (FTP) account request, a custom request, a Network Address Translation (NAT) modification request, a modification associated with a group of associated IP addresses.

In other embodiments, a computer program product for managing firewall change requests in a communication network, comprises a computer readable storage medium having computer readable program code embodied therein. The computer readable program code comprises computer readable program code configured to provide a change request interface comprising a plurality of change request form types, each request form comprising an interface for entering requestor identification information, Internet Protocol (IP) address information, change implementation schedule information, and submission information specifying any requestor instructions for implementing the change, computer readable program code configured to receive completed change request forms from at least one requestor, computer readable program code configured to arrange the completed change request forms in a request queue, and computer readable program code configured to present the request queue to at least one administrator responsible for implementing firewall changes in the communication network Other methods, systems, devices, appliances, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
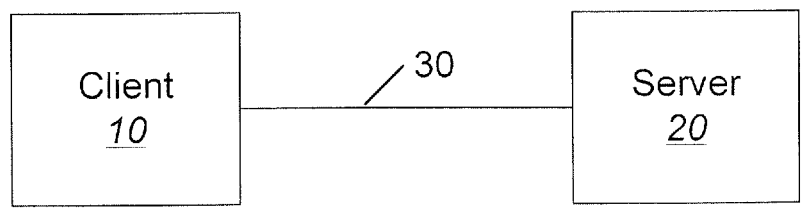
FIG. 1 is a block diagram that illustrates a client-server environment in accordance with some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments may be embodied as methods, systems, devices and/or computer program products. Accordingly, exemplary embodiments may be embodied in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

According to some embodiments, methods and systems are provided that may allow an enterprise to manage change requests to firewalls in their communication network. The methods and systems, according to some embodiments, may alleviate redundant and time consuming tasks and functions that are typically performed by a firewall administrator team. Moreover, the methods and systems, according to some embodiments, may provide a robust and intuitive means for requestors to perform their firewall rule submissions in a timely fashion.

Exemplary embodiments can operate in a logically separated client side/server side-computing environment, sometimes referred to hereinafter as a client/server environment. As shown in FIG. 1, a client 10 may communicate with a server 20 over a wireless and/or wireline communication medium 30. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a Web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

Figure 2:
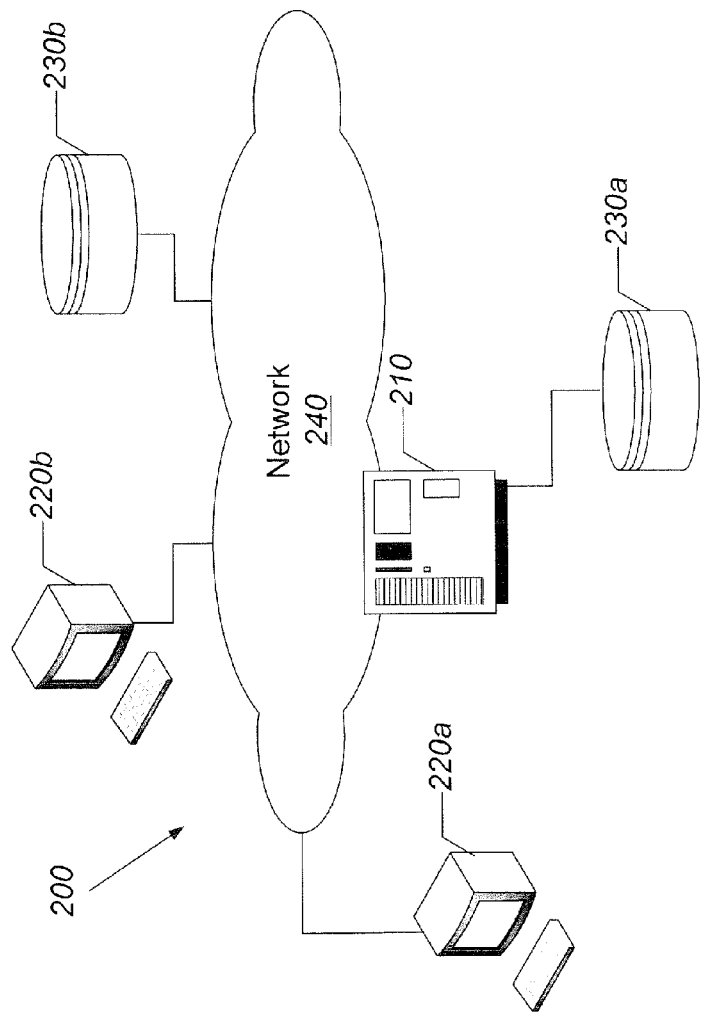
FIG. 2 is a block diagram that illustrates a communication network architecture in a firewall change request management server is used to manage firewall change requests in accordance with some embodiments.

Referring now to FIG. 2, a network architecture 200 that facilitates firewall change management, in accordance with some embodiments, includes client devices 220a and 220b that are coupled to a communication network 240 as shown. Each of the client devices 220a and 220b include a firewall change management client interface to allow the device to communicate with a firewall change management server 210. The firewall change management server 210 may be implemented as a single data processing system or a network of multiple data processing systems. The network 240 may represent a global network, such as the Internet, or other publicly accessible network. The network 240 may also, however, represent a wide area network, a local area network, an Intranet, or other private network, which may not accessible by the general public. Furthermore, the network 240 may represent a combination of public and private networks or a virtual private network (VPN). Moreover, the client devices 220a and 220b may be embodied as any electronic device that is capable of accessing a network. Thus, according to various embodiments, a client device may be a mobile terminal or may be relatively stationary. The firewall change manage server 210 may communicate with one or more databases, which may be directly connected to the firewall change management server 210 (database 230a) or may be connected to the firewall change management server 210 via the network 240 (database 230b). The databases 230a and 230b contain the software and/or data used to manage change requests to one or more firewalls in the communication network 240 as described herein.

Although FIG. 2 illustrates an exemplary communication network, it will be understood that the present invention is not limited to such configurations, but is intended to encompass any configuration capable of carrying out the operations described herein.

Figure 3:
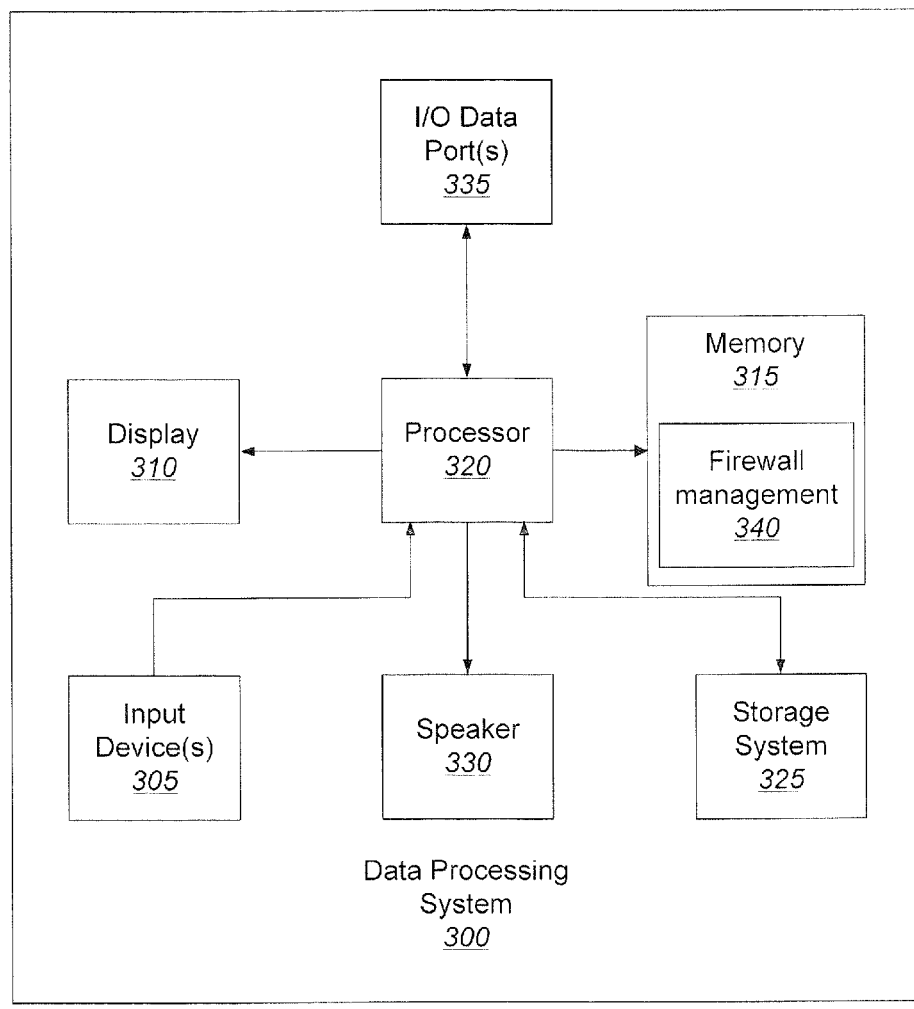
FIG. 3 is a block diagram that illustrates a data processing system that can be used to implement the firewall change request management server of FIG. 2 in accordance with some embodiments.

FIG. 3 illustrates a data processing system 300 that may be used, for example, to implement a firewall change management server and may include a module for managing firewall change requests in a client-server environment, in accordance with some embodiments. The data processing system 300 comprises input device(s) 305, such as a keyboard or keypad, a display 310, and a memory 315 that communicate with a processor 320. The data processing system 300 may further comprise a storage system 325, a speaker 330, and an I/O data port(s) 335 that also communicate with the processor 320. The storage system 325 may include removable and/or fixed media, such as floppy disks, ZIP drives, hard disks, or the like as well as virtual storage such as a RAMDISK. The I/O data port(s) 335 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 315 may be configured with a firewall change management module 340 that may be used to provide an interface for requestors to submit firewall change requests and to process any submitted requests as described below.

Figure 4:
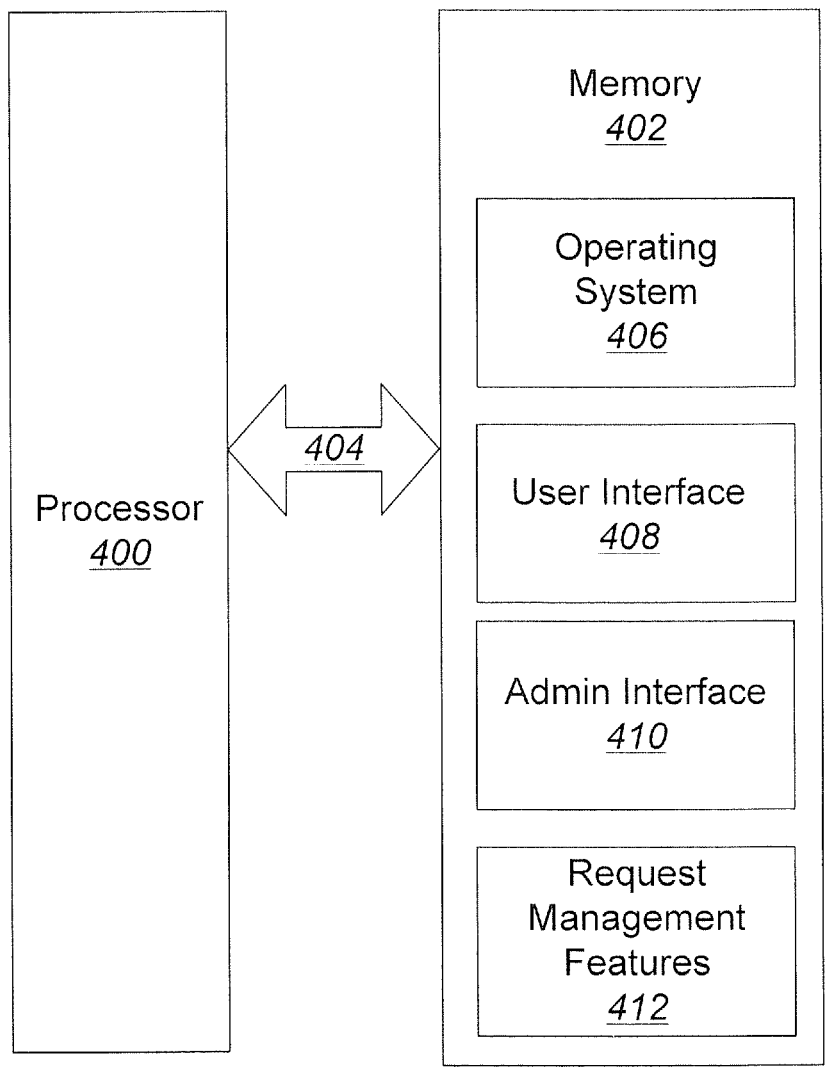
FIG. 4 is a block diagram that illustrates a software/hardware architecture for a firewall change request management server in accordance with some embodiments.

FIG. 4 illustrates a processor 400 and memory 402 that may be used in embodiments of firewall change management systems, such as the firewall change management server 210 of FIGS. 2 and 300 of FIG. 3. The processor 400 communicates with the memory 402 via an address/data bus 404. The processor 400 may be, for example, a commercially available or custom microprocessor. The memory 402 is representative of the one or more memory devices containing the software and data used to manage firewall change requests in a communication network according to some embodiments. The memory 402 may include, but is not limited to, the following types of devices: cache, ROM, PROM, EPROM, EEPROM, flash, SRAM, and DRAM.

As shown in FIG. 4, the memory 402 may contain up to four or more categories of software and/or data: operating system(s) 406, a user interface module 408, an administrator interface module 410, and a change request management features module 412. The operating system 406 generally controls the operation of the data processing system. In particular, the operating system 406 may manage the data processing system's software and/or hardware resources and may coordinate execution of programs by the processor 400. The user interface module 408 may be configured to provide an interface for requestors to submit firewall change requests through a client device, such as client devices 220a and 220b of FIG. 1. The administrator interface module 410 may be configured to provide an interface for network administrators or other management/supervisory personnel to review and process firewall change requests that have been submitted by one or more requestors. The change request management features module 412 may be configured to provide the various features described hereafter in managing firewall change requests according to some embodiments.

Although FIGS. 3 and 4 illustrate exemplary hardware/software architectures that may be used to manage firewall change requests in a communication network, it will be understood that embodiments of the present invention is not limited to such configurations but is intended to encompass any configuration capable of carrying out operations described herein. Moreover, the functionality of the data processing system 300 of FIG. 3 and/or the firewall change management server 210 of FIG. 2 may be respectively implemented as a single processor system, a multi-processor system, or even a network of stand-alone computer systems, in accordance with various embodiments.

Computer program code for carrying out operations of data processing systems discussed above with respect to FIGS. 1-4 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products. These flowchart and/or block diagrams further illustrate exemplary operations for managing firewall change requests in a communication network, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 5:
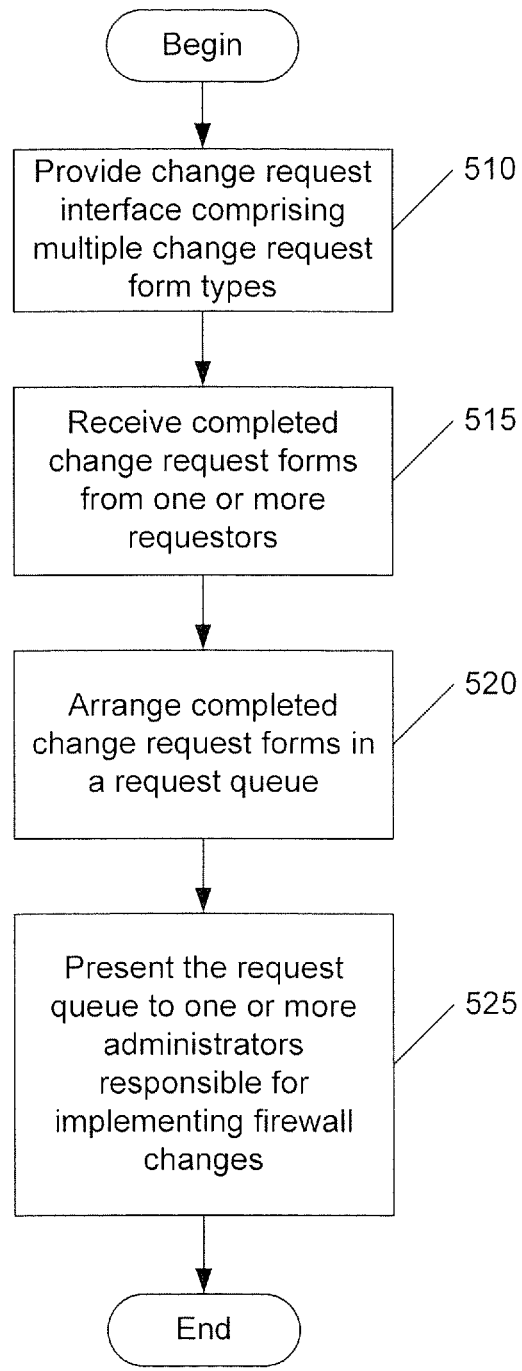
FIG. 5 is a flowchart that illustrates operations for managing firewall change requests in accordance with some embodiments.

Referring now to FIG. 5, exemplary operations for managing firewall change requests in a communication network, according to some embodiments, begin at block 510 where the firewall change management server 210 provides a change request interface that includes multiple change request form types. Each request form type includes an interface or entering requestor identification information, such as name, phone number, email address, job title, and/or project information, IP address and/or port information, change implementation schedule information, and/or any special directions. Change implementation schedule information options may be presented to the requestor based on calculations done due to the affected security nodes affected, the severity/impact of the request, and/or any lead time for security to approve/implement the request.

At block 515, the firewall change management server 210 may receive one or more completed change request forms from one or more requestors. The completed change request forms may be arranged in a request queue at block 520 and presented to one or more administrators responsible for implementing firewall changes in the communication network at block 525. Such administrators may include, but are not limited to, management personnel, security personnel, and technical personnel.

Various features of firewall change management, according to some embodiments, are described hereafter.

Authentication

The firewall change management server 210 may authenticate requestors using single sign on authentication techniques.

Request Queue

The firewall change request queue may be arranged in a linear time chart and may include, for each change request, date information, time information, requestor identification information, tester identification information, change request approval status, change management implementation status, and/or an overall status of the firewall change request.

Request Forms

The firewall change request forms may include, but are not limited to, the following types of forms: 1) a standard source to destination request form (for standard source to destination IP via port requests), 2) an IP change/duplicate/remove request form to change, duplicate, or remove IP addresses as they exist in firewall rules, 3) a File Transfer Protocol (FTP)

account request form to request a user or server account for access through a gateway, 4) a custom request form for entering custom change text that doesn't fall into another form type, 5) a Network Address Translation (NAT) modification request form to change original and translation fields for NAT implementations, and 6) modify or create a firewall group form to create a group of associated IP addresses that can be used in firewall rules or modify an already existing group.

Approval

Different levels of approval may be required for various firewall change requests. Typically, all requests are approved by a security administrator. In some embodiments, some or all requests are also approved by one or more levels of enterprise management. Firewall changes may not be implemented until any necessary approvals are obtained.

Notification

Security administrators, management personnel, and/or requestors may be provided with notifications that include status information about completed change request forms. Approvals, rejections, and questions may, for example, be sent directly to a requestor via email. In some embodiments, some notifications may be pre-defined responses depending on what type of notification is being sent.

Firewall Communication

The firewall change request server 210 may communicate with one or more firewalls in the communication network to perform IP finds, determine installed policies/rules, to insert IP address and/or IP group information into firewall rules, to perform rule based remediation, and/or to recommend modifications to firewall rules.

Affected Firewall Security Nodes—Topology

The firewall change request server 210 may keep track of the topology of the communication network and may determine which firewalls in the communication network are affected by a submitted change request form. These determined or found firewalls may be used in determining the severity/impact of a change. Moreover, the firewall change request server 210 may define and insert firewall security nodes into the network topology. One or more segments may be defined and/or inserted into the topology of the network. The purpose of the various segments may also be defined, such as, for example, whether the segment is an Internet segment, Intranet segment, an environment segment (common access point coupler), and/or an application segment.

Proxy Block/Unblock Queue

When a user goes to a website that is blocked the firewall change request server 210 may provide a security page that loads notifying the user that the site is blocked and allowing the user to request that access to the site be unblocked. The received request may be presented to one or more administrators or other personnel responsible for controlling access to the site and may determine whether to grant the user's access request or not. The administrator may reply to the user with an approval, denial, or questions to obtain more information.

IP/Port Group Creation

As discussed above, the firewall change request server 210 may provide an interface for users to create IP address groups or port groups. These groups are a collection of associated IP addresses or port names that can be treated as one logical entity for use in change requests and in firewall rules and policies.

Reports

The firewall change request server 210 may generate various reports for requestors, security administrators, management personnel, and other individuals who have interest in the management of firewalls in the communication network. These reports may include, but are not limited to, such things as today's, this week's, this month's, this year's changes, topology information, affected application information, and communication network segment information.

Bug Tracker

The firewall change request server 210 may provide an interface for individuals to report bugs in the system. The status and resolution of such bugs may be tracked by various personnel.

Lightweight Directory Access Protocol (LDAP) Integration

The firewall change request server 210 may perform LDAP lookups to assist in the auto-completion of user-entered identification information. For example, when a requestor lists a tester for a firewall change, the requestor need only put in his/her User ID and the User ID of the tester and the rest of the identification information for the requestor and tester may be auto-filled.

Accountability Controls

According to some embodiments, a requestor may view on the firewall change request server 210 only those firewall change requests that he/she submitted. Change requests submitted by others may not be viewed unless the viewer has some type of administrator status, supervisory status, or the like. Changes by both requestors and administrators may be recorded in a database history.

Documentation

In some embodiments, a WIKI may be provided by which administrators can record documentation, troubleshooting, implementation steps, common issues, contacts, and the like in managing firewall change requests.

Address Zone Lookup

In accordance with some embodiments, a requestor can enter one or more IP addresses or network names and the firewall change request server 210 may identify which firewall or intranet zone they addresses/network(s) are located in.

Affected Firewalls by Application

When a requestor fills out a firewall change request form, the requestor may indicate which application or project the request is for. The firewall change request server 210 may determine which applications are affected by which firewalls to allow the appropriate personnel to be notified when changes are made to a firewall so that, for example, regression testing can be performed to ensure that any change to a firewall does not break any existing application or project.

IP Address Find

According to some embodiments, a requestor may enter an IP address, range of IP addresses, group of IP addresses, or the like and the firewall change request server 210 may identify one or more firewalls rules that the entered IP address information exists in. In some embodiments, the firewall change request server 210 may generate an intuitive representation of the firewall rule(s) in which the result exists, e.g., what group of rules contain the IP address information, how deep in a rule the information is found, etc.

Rule Consolidation/Remediation

The firewall change request server 210 may examine firewall rules in the communication network and make recommendations with respect to consolidating and/or removing one or more rules to make the rule base more efficient. A fuzzy logic factor may determine what the criteria threshold is for a given firewall. For example, if 90% of the sources and 90% of the destinations match in two different rules, then a recommendation may be made to join these two rules. The fuzzy logic factor may be specified differently for each firewall based on what type of firewall it is. For example, a production Internet facing firewall may have a factor of 100% while an internal lab firewall may have a factor of 75%. When a user submits a request for a new firewall rule, the change request server 210 may determine whether the requested rule may be implemented through a pre-existing rule or whether a new rule needs to be created.

Tutorials

The firewall change request server 210 may provide tutorials as part of the various user interface screens to provide help if a user needs assistance.

The flowchart of FIG. 5 illustrates the architecture, functionality, and operations of some embodiments of methods, systems, and computer program products for firewall change requests in a communication network. In this regard, each block represents a module, segment, or portion of code, which comprises one or more executable instructions for implementing the specified logical function(s). It should also be noted that in other implementations, the function(s) noted in the blocks may occur out of the order noted in FIG. 6. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of managing firewall change requests for a communication network, comprising:
providing a change request interface comprising a plurality of change request form types, each request form comprising an interface for entering requestor identification information, internet protocol address information, change implementation schedule information, and submission information specifying any requestor instructions for implementing the change, wherein the plurality of change request form types comprises the following request types:
a standard source to destination request, an internet protocol address modification to existing firewall rules request, a file transfer protocol account request, a custom request, a network address translation modification request, and a modification associated with a group of associated internet protocol addresses,
receiving completed change request forms from a requestor,
arranging the completed change request forms in a request queue,
presenting the request queue to an administrator responsible for implementing firewall changes in the communication network,
identifying an application affected by the firewall changes in the communication network;
sending a notification to an individual responsible for the application informing the individual that the application is affected by the firewall changes;
inserting a firewall security node in a topology of the communication network; and
providing an intuitive representation of the existing firewall rules affected by the internet protocol address received through the internet protocol address modification to existing firewall rules request.

2. The method of claim 1, wherein the request queue comprises one of the following types of information for each of the completed change request forms: date information, time information, the requestor identification information, tester information, affected firewall information, and change request status information.

3. The method of claim 1, further comprising:
sending notifications to the requestor associated with each of the completed change request forms, respectively, wherein each of the notifications comprises status information associated with the change request.

4. The method of claim 1, further comprising:
communicating with a firewall in the communication network regarding one of internet protocol address information, policy information, and rule information.

5. A system for managing firewall change requests in a communication network comprising:
a processor; and
a memory coupled to the processor, the memory comprising computer readable program code that when executed by the processor causes the processor to perform operations comprising:
providing a change request interface comprising a plurality of change request form types, each request form comprising an interface for entering requestor identification information, internet protocol address information, change implementation schedule information, and submission information specifying any requestor instructions for implementing the change, wherein the plurality of change request form types comprises the following request types:
a standard source to destination request, an internet protocol address modification to existing firewall rules request, a file transfer protocol account request, a custom request, a network address translation modification request, and a modification associated with a group of associated internet protocol addresses,
receiving completed change request forms from a requestor,
arranging the completed change request forms in a request queue,
presenting the request queue to an administrator responsible for implementing firewall changes in the communication network,
identifying an application affected by the firewall changes in the communication network;
sending a notification to an individual responsible for the application informing the individual that the application is affected by the firewall changes;
inserting a firewall security node in a topology of the communication network; and
providing an intuitive representation of the existing firewall rules affected by the internet protocol address received through the internet protocol address modification to existing firewall rules request.

6. A computer program product for managing firewall change requests in a communication network, comprising:
a non-transitory computer readable storage medium having computer readable program code embodied in the medium, the computer readable program code when executed by a processor causing the process to perform operations comprising:
providing a change request interface comprising a plurality of change request form types, each request form comprising an interface for entering requestor identification information, internet protocol address information, change implementation schedule information, and submission information specifying any requestor instructions for implementing the change, wherein the plurality of change request form types comprises the following request types:

a standard source to destination request, an internet protocol address modification to existing firewall rules request, a file transfer protocol account request, a custom request, a network address translation modification request, and a modification associated with a group of associated internet protocol addresses, receiving completed change request forms from a requestor, arranging the completed change request forms in a request queue, presenting the request queue to an administrator responsible for implementing firewall changes in the communication network, identifying an application affected by the firewall changes in the communication network;

sending a notification to an individual responsible for the application informing the individual that the application is affected by the firewall changes;

inserting a firewall security node in a topology of the communication network; and providing an intuitive representation of the existing firewall rules affected by the internet protocol address received through the internet protocol address modification to existing firewall rules request.

7. The method of claim 1, further comprising:
defining a group of associated internet protocol addresses;
wherein one of the completed change request forms comprises the group of associated internet protocol addresses.

8. The method of claim 7, wherein the group is defined by the requestor for use in the change request form.

9. The method of claim 7, wherein the group is defined by the administrator for use by the requestor in the change request form.

* * * * *